US010458560B2

(12) United States Patent
Yo et al.

(10) Patent No.: US 10,458,560 B2
(45) Date of Patent: Oct. 29, 2019

(54) PILOT CHECK VALVE

(71) Applicant: SMC CORPORATION, Chiyoda-ku (JP)

(72) Inventors: Seikai Yo, Toride (JP); Hirosuke Yamada, Tsukubamirai (JP); Hitoshi Yamamoto, Shimotsuma (JP)

(73) Assignee: SMC CORPORATION, Chiyoda-ku (JP)

( * ) Notice: Subject to any disclaimer, the term of this patent is extended or adjusted under 35 U.S.C. 154(b) by 37 days.

(21) Appl. No.: 15/515,881

(22) PCT Filed: Jul. 8, 2015

(86) PCT No.: PCT/JP2015/069601
§ 371 (c)(1),
(2) Date: Mar. 30, 2017

(87) PCT Pub. No.: WO2016/056280
PCT Pub. Date: Apr. 14, 2016

(65) Prior Publication Data
US 2017/0307093 A1    Oct. 26, 2017

(30) Foreign Application Priority Data

Oct. 10, 2014    (JP) .................................. 2014-209252

(51) Int. Cl.
*F16K 15/18*    (2006.01)
*F16K 15/02*    (2006.01)
(Continued)

(52) U.S. Cl.
CPC .......... *F16K 15/186* (2013.01); *F16K 15/021* (2013.01); *F16K 15/026* (2013.01);
(Continued)

(58) Field of Classification Search
CPC .... F16K 15/186; F16K 15/021; F16K 15/063; F16K 15/026
See application file for complete search history.

(56) References Cited

U.S. PATENT DOCUMENTS 3,357,215 A * 12/1967 Riester .................... E05B 77/50
180/289
4,705,459 A * 11/1987 Buisine ................... F04B 51/00
137/554

(Continued)

FOREIGN PATENT DOCUMENTS

JP    3-25080 U    3/1991

OTHER PUBLICATIONS

International Search Report dated Oct. 6, 2015 in PCT/JP2015/069601 filed Jul. 8, 2015.

*Primary Examiner* — Jessica Cahill
*Assistant Examiner* — Angelisa L. Hicks
(74) *Attorney, Agent, or Firm* — Oblon, McClelland, Maier & Neustadt, L.L.P.

(57) ABSTRACT

A pilot check valve includes: a fluid channel body; a moveable body that moves in an axial direction under effects of pilot pressure; a packing including a lip portion that is displaceable, integrally with the moveable body, between a valve close position and a valve open position; and a detector to detect position of the moveable body. The packing, in the valve close position, allows flow of an operating liquid from a first port side of the fluid channel body to a second port side and prevents the flow of the operating liquid from the second port side to the first port side, and in the valve open position, connects the first port and the second port.

5 Claims, 5 Drawing Sheets

(51) Int. Cl.
   *F16K 15/06* (2006.01)
   *F16K 37/00* (2006.01)
(52) U.S. Cl.
   CPC ........ *F16K 15/063* (2013.01); *F16K 37/0033* (2013.01); *F16K 37/0041* (2013.01)

(56) References Cited

U.S. PATENT DOCUMENTS

2013/0202457 A1* 8/2013 Bayyouk .................. B23P 6/00
                                              417/279
2014/0305115 A1* 10/2014 Matsuda ............... F15B 13/027
                                              60/338

* cited by examiner

PILOT CHECK VALVE

TECHNICAL FIELD

The present invention relates to a pilot check valve that utilizes a pilot pressure for controlling flow of a working fluid.

BACKGROUND ART

Heretofore, it is well known that, in a fluid pressure circuit for operating a fluid pressure cylinder, a pilot check valve is provided in order to appropriately control the flow of a working fluid (for example, see Japanese Laid-Open Utility Model Publication No. 03-025080). For example, in a fluid pressure circuit in which the fluid pressure cylinder is used as a lift cylinder, a head-side pressure chamber of the cylinder and a rod-side pressure chamber thereof are connected to a pressure supply source through a switching valve, and a pilot check valve is arranged in a flow channel between the rod-side pressure chamber and the switching valve.

The pilot check valve is equipped with a poppet valve plug that is elastically urged toward a valve seat by a spring, and a pilot piston facing the poppet valve plug and which is disposed slidably in an axial direction thereof. The pilot piston presses the poppet valve plug when a pilot pressure is applied. When a supply pressure is applied to the head-side pressure chamber of the cylinder, the pilot pressure is applied to the pilot check valve.

In the fluid pressure circuit as above constructed, when the working fluid is supplied from the pressure supply source to the pilot check valve through the switching valve, under pressure based on the working fluid, the poppet valve plug is separated away from the valve seat against the elastic force of the spring, whereby the working fluid flows into the rod-side pressure chamber of the cylinder, to thereby press the piston of the cylinder upwardly. When the piston reaches an upper end position, the pressure difference between the upstream side and the downstream side of the poppet valve plug becomes zero, and as a result, the poppet valve plug is seated on the valve seat by the elastic force of the spring. Thus, even if supply of the pressure from the pressure supply source is stopped, the poppet valve plug remains closed, and therefore the cylinder is prevented from dropping down.

On the other hand, when the working fluid is supplied from the pressure supply source to the head-side pressure chamber of the cylinder through the switching valve, the pilot piston is advanced by the pilot pressure, and presses the poppet valve plug, whereby the poppet valve plug is separated away from the valve seat. Consequently, the fluid in the rod-side pressure chamber of the cylinder is discharged from the switching valve through the pilot check valve, so that the cylinder is lowered.

In the above fluid pressure circuit to which the conventional pilot check valve is applied, in order to prevent the cylinder from dropping down, it is necessary to stop the pressure supply after the valve has been placed in a valve closed state. However, the conventional pilot check valve is not equipped with a function for detecting the closing of the valve. Further, the poppet valve plug and the pilot piston are provided separately from each other, and the position of the pilot piston does not always correspond to the state of the poppet valve plug. Thus, even if the position of the pilot piston is detected, it is difficult to determine whether the poppet valve plug is seated or not, based on the detected position. Therefore, in the conventional pilot check valve, it is impossible to suitably detect whether the valve is in a valve closed state or not.

SUMMARY OF INVENTION

The present invention has been devised taking into consideration the aforementioned problems, and has the object of providing a pilot check valve which is capable of suitably detecting whether the valve is placed in a valve closed state or not.

In order to achieve the above object, the present invention is characterized by a pilot check valve including a flow passage body including a first port and a second port, a movable body which is at least partly disposed slidably in the flow passage body and configured to move in an axial direction thereof under action of a pilot pressure, a packing mounted on the movable body and configured to be displaced between a valve closed position and a valve open position integrally with the movable body, the packing including an inclined lip which is elastically deformable radially, the lip being configured to make sliding contact with an inner circumferential surface of the flow passage body, and a detector configured to detect whether or not the movable body is placed at a position that causes the packing to be positioned at the valve closed position, wherein, in the valve closed position, the packing allows a working fluid to flow from the first port toward the second port, and blocks flow of the working fluid from the second port toward the first port, and in the valve open position, the packing allows the first port and the second port to communicate with each other.

With the above-constructed pilot check valve, since the movable body and the packing are integrally displaced in the axial direction, it is possible to appropriately detect whether or not the valve is in a valve closed state (whether or not the packing is placed at the valve closed position) by detecting the position of the movable body. Further, when the packing is placed at the valve closed position, the packing allows the working fluid to flow from the first port toward the second port, while blocks the flow of the working fluid from the second port toward the first port. Thus, also in a state that a pilot pressure is released, a check valve function can be fulfilled effectively.

In the above pilot check valve, when the lip of the packing is moved from the valve open position toward the valve closed position, the lip preferably starts to make contact with the inner circumferential surface of the flow passage body at a sealing start position located between the valve closed position and the valve open position. In this case, when the packing is moved from the valve open position toward the valve closed position, the detector preferably outputs a signal after the packing has been moved beyond the sealing start position.

With the structure, when the lip of the packing is moved from the valve open position toward the valve closed position, the lip is placed in sliding contact with the inner circumferential surface of the flow passage body within a predetermined range in the axial direction. In this manner, the sealing mechanism formed by contact of the lip with the inner circumferential surface has an overlap region in the axial direction. Owing to the overlap region, since detection error by the detector and influence of hysteresis are eliminated, the detector can be prevented from outputting a signal in a state that the valve is not fully closed. Stated otherwise, it is secured that the valve is fully closed when the detector outputs a signal. Thus, reliability of the position detecting function can be enhanced.

In the above pilot check valve, preferably, the inner circumferential surface of the flow passage body includes a sealing region configured to make pressing contact with the lip when the packing is placed at the valve closed position, and a non-sealing region configured to be separated away from the lip when the packing is placed at the valve open position, and an inner diameter of the non-sealing region is larger than that of the sealing region.

With the above structure, depending on the position of the packing in the axial direction within the flow passage body, it is possible to easily and reliably switch between a communication state of the first port and the second port, and a non-communication state thereof.

In the above pilot check valve, preferably, a packing support member configured to surround the packing and prevent the lip from being deformed radially outwardly by a predetermined amount or more is further provided.

With the structure, it is possible to prevent excessive deformation of the lip and enhance the durability of the packing.

In the above pilot check valve, preferably, the packing support member includes a passage configured to allow the working fluid to flow from the first port toward the lip.

With the structure, a function for protecting the lip can be suitably fulfilled without inhibiting the check valve function of the packing.

With the pilot check valve according to the present invention, it is possible to appropriately detect whether or not the valve is in a valve closed state.

DESCRIPTION OF EMBODIMENTS

Hereinafter, a preferred embodiment of a pilot check valve according to the present invention will be described with reference to the accompanying drawings.

Figure 1:
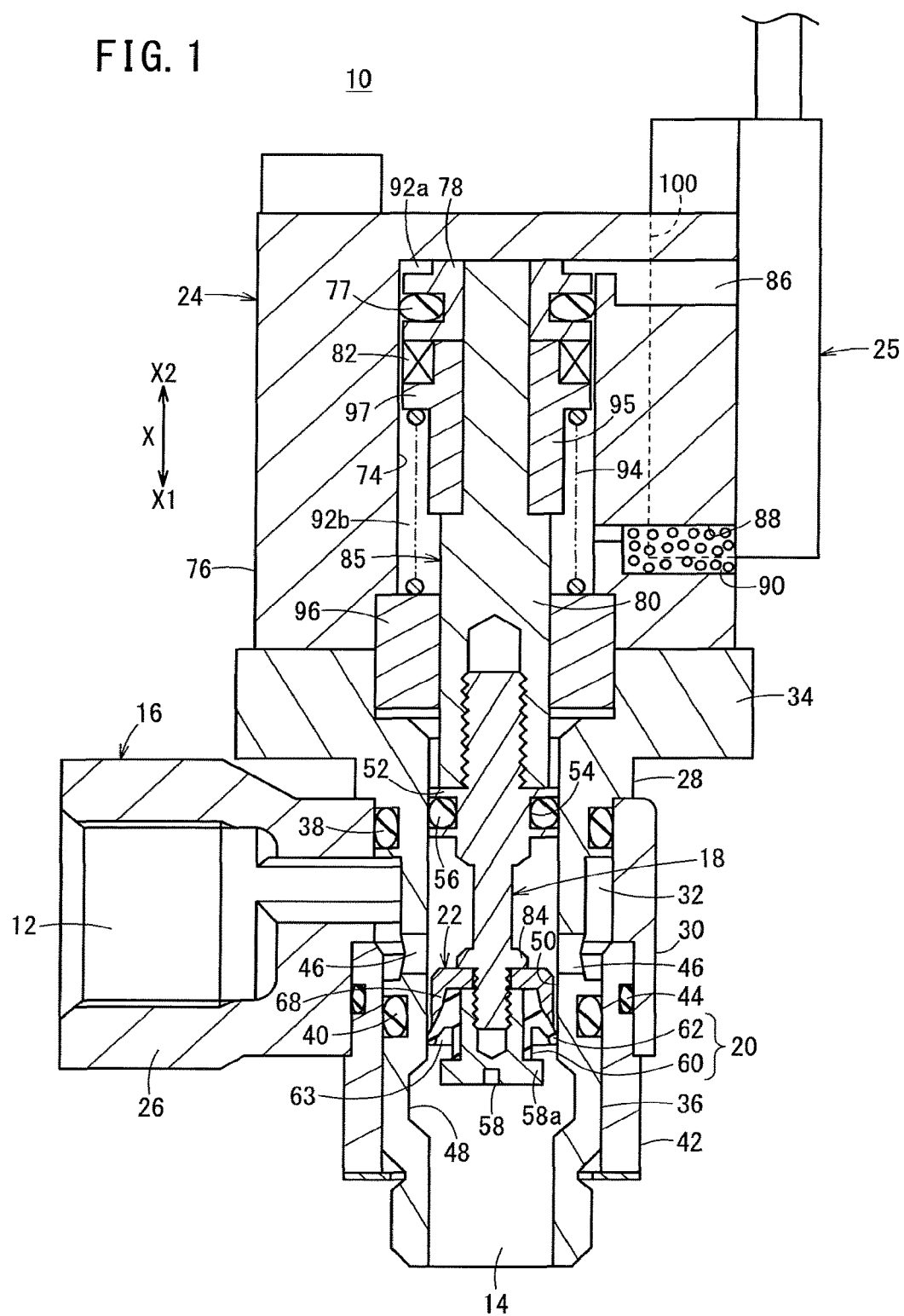
FIG. 1 is a cross sectional view showing a valve closed state of a pilot check valve according to an embodiment of the present invention.
Figure 3:
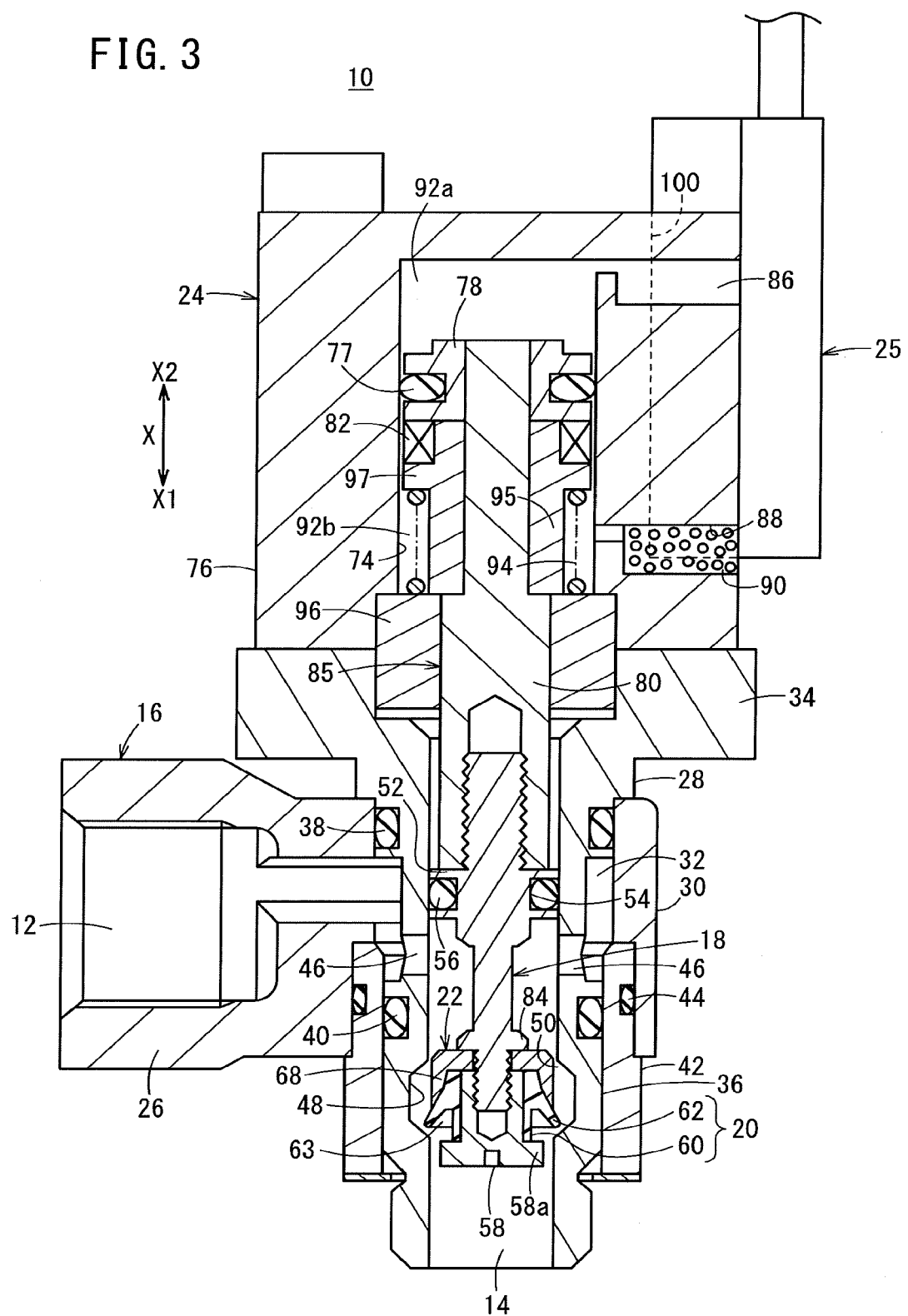
FIG. 3 is a cross sectional view showing a valve open state of the pilot check valve shown in FIG. 1.

FIG. 1 is a cross sectional view showing a valve closed state of a pilot check valve 10 according to an embodiment of the present invention. FIG. 3 is a cross sectional view showing a valve open state of the pilot check valve 10. The pilot check valve 10 comprises a flow passage body 16 having a first port 12 and a second port 14, a working rod 18 disposed in the flow passage body 16 so as to be slidable in an axial direction thereof (in the direction indicated by arrow X), a packing 20 mounted on the working rod 18, a packing support member 22 mounted on the working rod 18, a pilot mechanism 24 joined to the flow passage body 16, and a detector 25 provided on the pilot mechanism 24.

The flow passage body 16 is a member that forms a flow passage for a working fluid (e.g., air). In the present embodiment, the flow passage body 16 comprises a hollow first body 26 having the first port 12, and a hollow second body 28 having the second port 14. The first body 26 includes an inserted portion 30 on an opposite side of the first port 12. The second body 28 is inserted in the inserted portion 30. The first body 26 surrounds the second body 28 in the inserted portion 30. An annular space 32, which communicates with the first port 12, is formed between the inserted portion 30 and the second body 28.

The second body 28 includes a coupling portion 34 which is coupled to the pilot mechanism 24, and a hollow cylindrical sleeve portion 36 which protrudes from the coupling portion 34 in a direction opposite to the pilot mechanism 24. The coupling portion 34 may be in the form of a nut having a hexagonal shape in transverse section, for example. The sleeve portion 36 is a portion that is inserted in the above-mentioned inserted portion 30 of the first body 26.

On an outer circumference of the sleeve portion 36, annular sealing members 38, 40 (for example, o-rings) are arranged in the axial direction at an interval. One sealing member 38 is installed between the sleeve portion 36 and the inserted portion 30. Between the inserted portion 30 and the sleeve portion 36, a hollow cylindrical spacer member 42 is provided. The other sealing member 40 is installed between the sleeve portion 36 and the spacer member 42. Between the spacer member 42 and the inserted portion 30, another sealing member 44 is provided.

In the sleeve portion 36, one or more (two in the illustrated example) side holes 46 are provided between the sealing member 38 and the sealing member 40. A hollow portion of the first body 26 and a hollow portion of the second body 28 communicate with each other through the side hole 46. Further, in the sleeve portion 36, an enlarged-diameter portion 48 is provided on an inner circumferential surface thereof located on a region closer to the second port 14 than the side hole 46, i.e., between the side hole 46 and the second port 14. The inner diameter of the enlarged-diameter portion 48 is larger than the inner diameter of a portion of the sleeve portion 36 between the side hole 46 and the enlarged-diameter portion 48, which will be hereinafter referred to as "a reduced-diameter portion 50". The reduced-diameter portion 50 has a constant inner diameter along the axial direction.

The working rod 18 is disposed so as to be slidable in the axial direction (X direction) within the sleeve portion 36 of the second body 28. More specifically, on a middle portion of the working rod 18 in the axial direction, an annular protrusion 52 which protrudes radially outwardly is provided. In the annular protrusion 52, a seal installation groove 54 is formed, and a sealing member 56 is installed in the seal installation groove 54. The sealing member 56 prevents leakage of fluid from the interior of the second body 28 toward the pilot mechanism 24.

On an end portion of the working rod 18 on a distal end side thereof (i.e., an opposite side to the pilot mechanism 24 or a side in the X1 direction), the packing 20 and the packing support member 22 are mounted. More specifically, a bush 58 is fixed to a distal end portion of the working rod 18 (in the illustrated example, the bush is screw-engaged with the distal end portion), whereby the packing 20 and the packing support member 22 are fixed to the distal end portion of the working rod 18. Thus, when the working rod 18 is moved in the axial direction, the packing 20 and the packing support member 22 are also moved in the axial direction integrally with the working rod 18.

The packing 20 is made up of an elastic body of a rubber or the like (for example, butyl rubber, isoprene rubber, butadiene rubber, silicone rubber, etc.), and has a hollow cylindrical shape as a whole. More specifically, the packing 20 includes a tubular base 60 which extends in parallel to the axial direction, and an annular lip 62 which is inclined and protrudes from an outer circumference of the tubular base 60 and which is elastically deformable radially.

In a valve closed position shown in FIG. 1, the packing 20 allows the working fluid to flow from the first port 12 toward the second port 14, while blocks flow of the working fluid from the second port 14 toward the first port 12. In a valve open position shown in FIG. 3, the packing 20 allows the first port 12 and the second port 14 to communicate with each other.

The lip 62 is inclined toward the distal end direction of the working rod 18 (X1 direction). The lip 62 circumferentially extends around an outer circumference of the tubular base 60 over the entire outer circumferential length. The lip 62 has an inner surface of a distal end portion which faces and is separated away from the outer circumferential surface of the tubular base 60. An annular groove 63, which is recessed in the X2 direction, is formed between the lip 62 and the tubular base 60. In a natural state of the lip 62, the outer diameter thereof is larger than the inner diameter of the reduced-diameter portion 50 of the sleeve portion 36, and smaller than the inner diameter of the enlarged-diameter portion 48.

As shown in FIG. 1, when the packing 20 is positioned within the reduced-diameter portion 50, the lip 62 is in contact with the inner circumferential surface of the sleeve portion 36 over the entire circumferential length in a state of being elastically compressively deformed slightly in a radial inward direction (in a state that the diameter of the lip 62 becomes slightly smaller than that in the natural state). Thus, the reduced-diameter portion 50 forms a sealing region that makes pressing contact with the lip 62 when the packing 20 is placed at the valve closed position.

On the other hand, as shown in FIG. 3, when the packing 20 is positioned within the enlarged-diameter portion 48, since the lip 62 is separated away from the inner circumferential surface of the sleeve portion 36, the packing 20 does not offer a sealing function. Thus, the enlarged-diameter portion 48 forms a non-sealing region that is separated away from the lip 62 when the packing 20 is placed at the valve open position.

The packing support member 22 is a member that surrounds the packing 20 and prevents the lip 62 from being deformed radially outwardly by a predetermined amount or more. In order for the packing support member 22 to have a higher rigidity than the packing 20, the packing support member 22 is made of hard resin material, metal material, etc., for example. The outer diameter of the packing support member 22 is substantially equal to or slightly smaller than the inner diameter of the inner circumferential surface of the sleeve portion 36 (more specifically, the inner diameter of the reduced-diameter portion 50).

Figure 4:
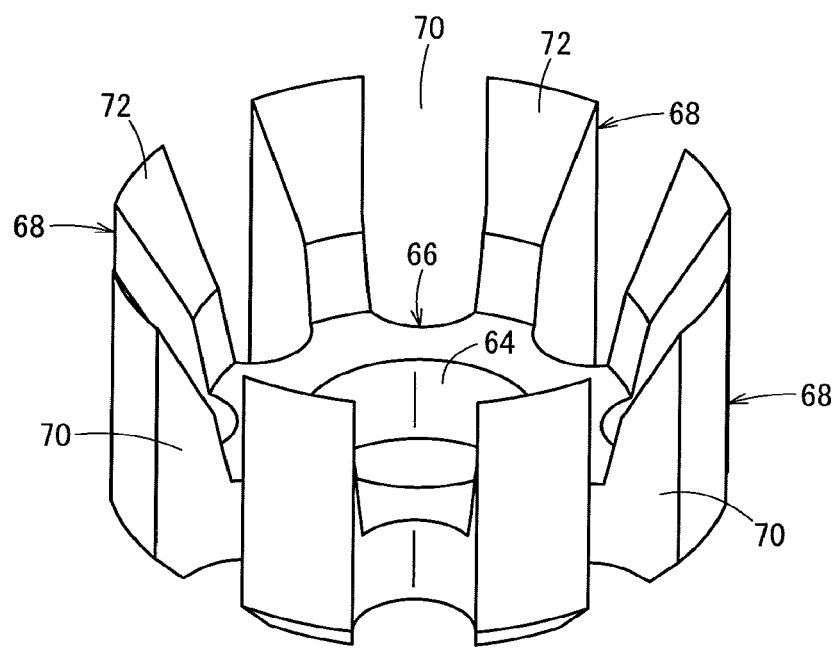
FIG. 4 is a perspective view showing a packing support member.

As shown in FIG. 4, the packing support member 22 includes a base 66 having a hole 64, and a plurality of support pieces 68 which protrude from the outer circumference of the base 66 in a thickness direction of the base 66 (X1 direction in FIG. 1, etc.). The support pieces 68 are circumferentially arranged at angular intervals, and passages 70 are formed in the axial direction between the adjacent support pieces 68, respectively. On an inner surface of each of the support pieces 68 on a protruding end side (distal end side), there is formed a tapered portion 72, by which an inner diameter formed by the support pieces 68 is gradually expanded toward the protruding end.

As shown in FIG. 1, etc., the packing 20 is disposed inside the support pieces 68 of the packing support member 22, and is held between a flange 58a of the bush 58 and an engagement protrusion 84 provided on the working rod 18. The support pieces 68 of the packing support member 22 are located at a position closer to a proximal end side of the working rod 18 (a side in the X2 direction) than the distal end of the lip 62, and support the lip 62 from the outside. The packing support member 22 is held between the packing 20 and the engagement protrusion 84, and also held between an end surface of the bush 58 and the engagement protrusion 84.

The pilot mechanism 24 includes a cylinder body 76 with a sliding hole 74 being formed therein, a piston 78 which is slidable in the axial direction within the sliding hole 74 and has a piston packing 77 installed on an outer circumference thereof, a drive rod 80 to which the piston 78 is joined, and a magnet 82 for position detection. The working rod 18 is joined to an end of the drive rod 80 on the side of the flow passage body 16, for example, by screw-engagement. The piston 78, the magnet 82, the drive rod 80, and the working rod 18 can be integrally displaced in the axial direction. The drive rod 80 and the working rod 18 jointly form a movable body 85.

The interior of the sliding hole 74 is partitioned into a first pressure chamber 92a on the piston 78 side, and a second pressure chamber 92b on the drive rod 80 side by the piston 78. The cylinder body 76 is provided with a pilot port 86 which communicates with the first pressure chamber 92a, and an atmosphere port 88 which allows the second pressure chamber 92b to communicate with the atmosphere. In the atmosphere port 88, it is preferable that, for example, a filter 90 having gas permeability may be disposed.

When the drive rod 80 and the piston 78 are displaced in the axial direction, the magnet 82 is also displaced in the axial direction integrally therewith. More specifically, a magnet holder 95 is fixed to the drive rod 80 at a position adjacent to the piston 78. The magnet 82 is retained between the magnet holder 95 and the piston 78. Alternatively, the magnet 82 may be attached to the piston 78.

The piston 78 is urged toward a side opposite to the flow passage body 16 by a spring 94 as an elastic urging means which is disposed in the cylinder body 76. In the illustrated example, one end of the spring 94 (the end in the X1 direction) abuts against a rod-side cover 96 joined to an end of the cylinder body 76 on the flow passage body 16 side, while another end of the spring 94 (the end in the X2 direction) abuts against an outward protrusion 97 provided on the magnet holder 95.

In the pilot mechanism 24 as constructed above, when a pilot pressure is applied to the first pressure chamber 92a through the pilot port 86, under the action of the pilot pressure, the piston 78 is moved in the X1 direction against the elastic force of the spring 94, and is stopped at a position shown in FIG. 3. At this time, a fluid in the second pressure chamber 92b is discharged to the atmosphere through the atmosphere port 88. On the other hand, when the pilot pressure is released, under the action of the elastic force of the spring 94, the piston 78 is moved in the X2 direction, and is returned to a position shown in FIG. 1.

The detector 25 detects whether or not the movable body 85 is located at a position which causes the packing 20 to be positioned at the valve closed position. For example, the detector 25 is attached to an attachment groove 100 provided on a side portion of the cylinder body 76. In the present embodiment, when the packing 20 reaches the valve closed position (fully closed position) shown in FIG. 1, and accordingly the magnet 82 reaches a predetermined position, the detector 25 detects a magnetic field of the magnet 82 and then outputs a signal. That is, the detector 25 is configured as a switch that is turned on when the pilot check valve 10 is in the valve closed state, and is turned off when the pilot check valve 10 is not in the valve closed state.

Figure 2:
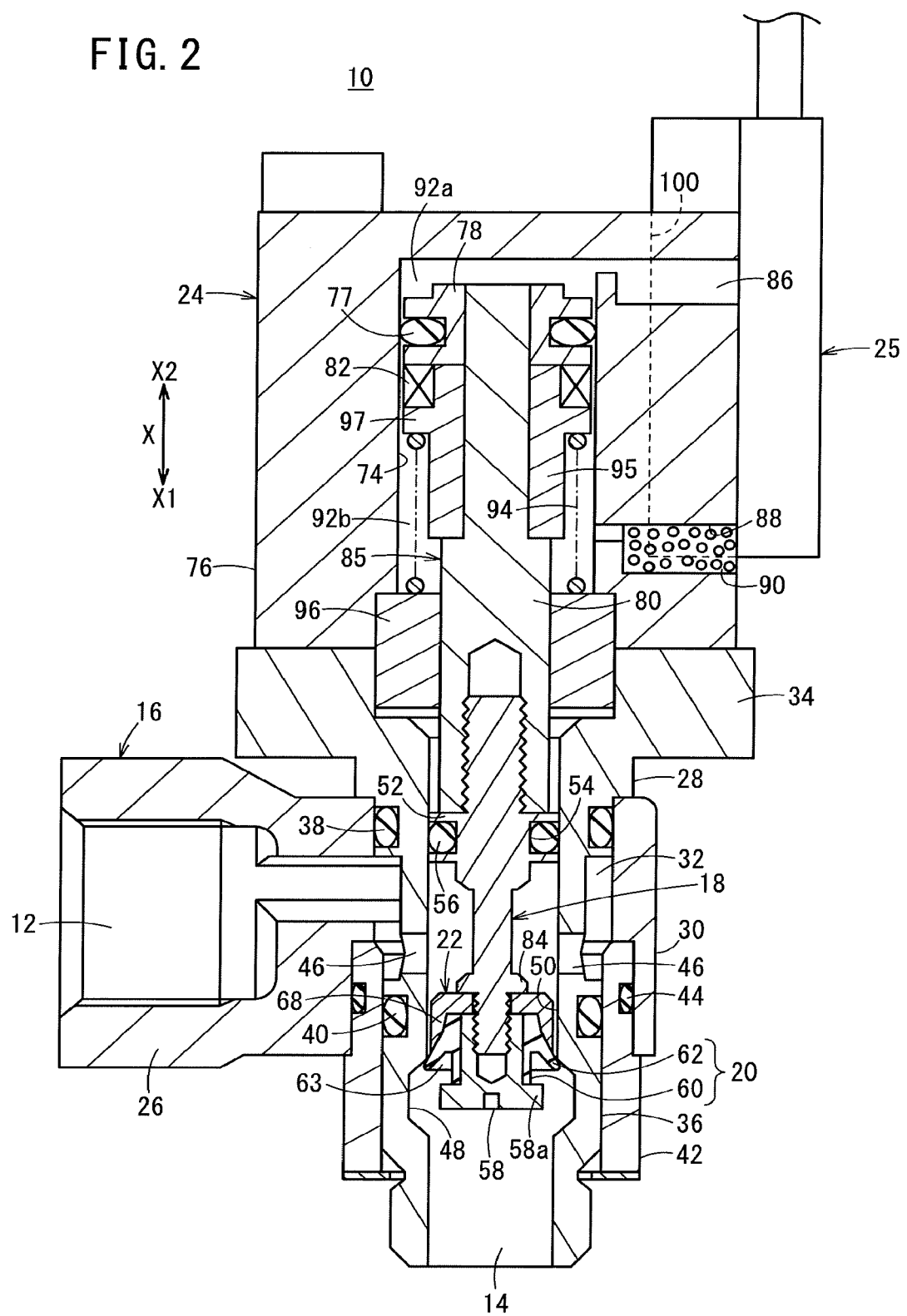
FIG. 2 is a cross sectional view showing an intermediate state of the pilot check valve shown in FIG. 1.

When the lip 62 of the packing 20 is moved from the valve open position (FIG. 3) toward the valve closed position (FIG. 1), the lip 62 starts to make contact with (seal) the inner circumferential surface of the flow passage body 16 at a position located between the valve closed position and the valve open position, as shown in FIG. 2. Hereinafter, the position of the packing 20 shown in FIG. 2 is referred to as "a sealing start position". In the present configuration, when the lip 62 is moved from the valve open position to the valve closed position, the lip 62 is placed in sliding contact with the inner circumferential surface of the flow passage body 16 within a predetermined range in the axial direction (the range from the sealing start position to the valve closed position). In this way, a sealing mechanism formed by contact of the lip 62 with the inner circumferential surface contains an overlap region in the axial direction.

In the case that the packing 20 is moved from the valve open position to the valve closed position, the detector 25 detects a magnetic field of the magnet 82 and outputs a signal after the packing 20 has been moved beyond the sealing start position. More specifically, in the case that the packing 20 is moved from the valve open position to the valve closed position, if the packing 20 only reaches the sealing start position, then the detector 25 neither detects a magnetic field of the magnet 82 nor outputs a signal. Thus, in the pilot check valve 10, when the detector 25 is outputting a signal, the valve is in a fully closed state (the packing 20 is at the valve closed position).

Figure 5:
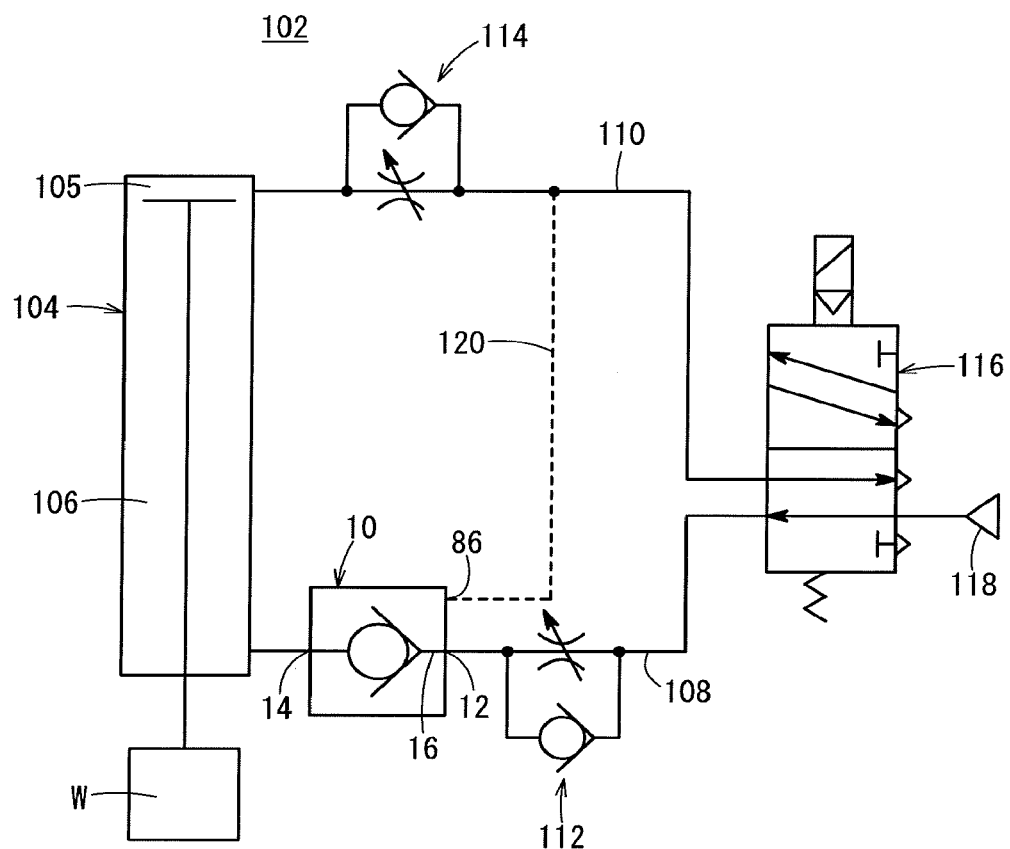
FIG. 5 is a schematic diagram of an example of a fluid pressure circuit to which the pilot check valve shown in FIG. 1 is applied.

When the pilot check valve 10 as constructed above is applied, for example, to a fluid pressure circuit 102 shown in FIG. 5, a cylinder 104 can be prevented from dropping down.

The fluid pressure circuit 102 is equipped with a cylinder 104 for moving up and down a heavy load W, a first supply/discharge passage 108 connected to a rod chamber 106 of the cylinder 104, a second supply/discharge passage 110 connected to a head chamber 105 of the cylinder 104, a first speed controller 112 provided in the first supply/discharge passage 108, a second speed controller 114 provided in the second supply/discharge passage 110, and the pilot check valve 10 provided in the first supply/discharge passage 108.

The fluid pressure circuit 102 is further equipped with a solenoid switching valve 116 connected to the first and second supply/discharge passages 108, 110, a pressure supply source 118 connected to the solenoid switching valve 116, and a pilot flow passage 120 branching from the second supply/discharge passage 110 and which is connected to the pilot port 86 of the pilot check valve 10. In this case, the first port 12 of the pilot check valve 10 is connected to the side of the solenoid switching valve 116, and the second port 14 thereof is connected to the side of the rod chamber 106 of the cylinder 104.

In the above-constructed fluid pressure circuit 102, as shown in FIG. 5, when the solenoid switching valve 116 is operated so as to establish communication between the first supply/discharge passage 108 and the pressure supply source 118, a working fluid from the pressure supply source 118 flows into the flow passage body 16 through the first port 12 of the pilot check valve 10. In this case, since a pilot pressure is not applied to the pilot check valve 10, as shown in FIG. 1, under the action of the elastic force of the spring 94, the packing 20 is placed at the valve closed position.

In the meanwhile, the working fluid flows into the second body 28 through the side hole 46 provided on the sleeve portion 36 of the second body 28, and passes through the packing 20 while deforming the packing 20 radially inwardly. More specifically, under the action of the working fluid, the lip 62 is pressed radially inwardly, whereby the lip 62 is separated away from the inner circumferential surface of the sleeve portion 36 (reduced-diameter portion 50) to thereby form a gap, and the working fluid then flows to the second port 14 through the gap. In this case, since the passages 70 (see FIG. 4) are formed in the axial direction on the outer circumference of the packing support member 22, flow of the working fluid from the first port 12 toward the second port 14 is not blocked.

Further, in FIG. 5, the working fluid flowing out of the second port 14 flows into the rod chamber 106 of the cylinder 104, whereas the fluid in the head chamber 105 of the cylinder 104 is discharged to the atmosphere through the second supply/discharge passage 110 and the solenoid switching valve 116, so that the cylinder 104 is moved up. When the cylinder 104 reaches an upper end position, the pressure difference between the upstream side and the downstream side of the packing 20 (pressure difference between the first port 12 side and the second port 14 side) becomes zero, and as a result, the lip 62 comes into close contact with the inner circumferential surface of the sleeve portion 36 again. In this state, since the packing 20 that is placed at the valve closed position blocks flow of the working fluid from the second port 14 toward the first port 12, the cylinder 104 is kept in position. Thus, the cylinder 104 can be prevented from dropping down.

On the other hand, when the solenoid switching valve 116 is operated so as to establish communication between the second supply/discharge passage 110 and the pressure supply source 118, the working fluid from the pressure supply source 118 is supplied to the head chamber 105 of the cylinder 104 through the second supply/discharge passage 110, while the working fluid is introduced into the first pressure chamber 92a of the pilot check valve 10 through the pilot flow passage 120. Accordingly, the piston 78 receives an acting force based on the pilot pressure, and the drive rod 80 joined to the piston 78 and the working rod 18 joined to the drive rod 80 are moved in the axial direction (X1 direction).

Accompanying the movement of the working rod 18, as shown in FIG. 3, the packing 20 is moved to the valve open position, and the first port 12 and the second port 14 are brought into communication with each other. That is, since the fluid is allowed to flow from the second port 14 toward the first port 12, the fluid in the rod chamber 106 of the cylinder 104 is discharged to the atmosphere through the first supply/discharge passage 108 and the solenoid switching valve 116, so that the cylinder 104 is moved downward. In this case, the dynamic pressure of the fluid that flows from the second port 14 toward the first port 12 acts on the lip 62 of the packing 20. However, since the lip 62 is held from the outer side by the support pieces 68 of the packing support member 22, excessive deformation (rolling back) of the lip 62 is prevented from occurring.

As described above, the pilot check valve 10 according to the present embodiment can detect whether or not the valve is in the valve closed state (whether or not the packing 20 is placed at the valve closed position) based on whether or not the detector 25 is outputting a signal. More specifically, when the valve is in the valve closed state, the detector 25 is turned on responsive to the magnetic field of the magnet 82, and then outputs a signal. Thus, in the fluid pressure circuit 102, after the cylinder 104 has reached the upper end position, in a state that the signal is being outputted from the detector 25, the supply pressure applied to the first port 12 is released. In this manner, the cylinder 104 can be prevented from dropping down.

Further, when the packing 20 is placed at the valve closed position, the working fluid is allowed to flow from the first port 12 toward the second port 14, whereas the flow of the working fluid from the second port 14 toward the first port 12 is blocked. Thus, also in a state that a pilot pressure is not applied to the pilot check valve 10, a check valve function can be fulfilled effectively.

In the case of the present embodiment, when the packing 20 is moved from the valve open position to the valve closed position, the lip 62 of the packing 20 starts to make contact with the inner circumferential surface of the flow passage body 16 at a position (sealing start position) located between the valve closed position and the valve open position. With the structure, when the lip 62 of the packing 20 is moved from the valve open position toward the valve closed position, the lip 62 is placed in sliding contact with the inner circumferential surface of the flow passage body 16 within a predetermined range in the axial direction.

In this manner, the sealing mechanism formed by contact of the lip 62 with the inner circumferential surface has an overlap region in the axial direction. Owing to the overlap region, since detection error by the detector 25 and influence of hysteresis are eliminated, the detector 25 can be prevented from outputting a signal in a state that the valve is not fully closed. Stated otherwise, it is secured that the valve is fully closed when the detector 25 is outputting a signal. Thus, reliability of the position detecting function can be enhanced.

Further, the pilot check valve 10 according to the present embodiment is equipped with the packing support member 22 surrounding the packing 20 and which prevents the lip 62 from being deformed radially outwardly by a predetermined amount or more. Thus, excessive deformation of the lip 62 is prevented when the fluid flows from the second port 14 toward the first port 12, and durability of the packing 20 can be enhanced.

Further, the packing support member 22 is provided with the passages 70 that allow the working fluid to flow from the first port 12 toward the lip 62. Thus, a function for protecting the lip 62 can be suitably fulfilled without inhibiting the check valve function of the packing 20.

The scope of application of the present embodiment is not limited to the fluid pressure circuit 102 as shown in FIG. 5. For example, the present invention may be applied to a fluid pressure circuit where two pilot check valves 10 are connected respectively to the head chamber and the rod chamber of the cylinder, and the position of the cylinder is fixed and held (i.e., operation of the cylinder is restricted) by the check valve function of the two pilot check valves 10 at the time of emergency stop.

Although a preferred embodiment of the present invention has been described in detail above, the present invention is not limited to the present embodiment, and it goes without saying that various design modifications may be made to the embodiment without departing from the scope of the present invention as set forth in the appended claims.

The invention claimed is:

1. A pilot check valve comprising:
a flow passage body including a first port and a second port;
a movable body which is at least partly disposed slidably in the flow passage body and configured to move in an axial direction thereof under action of a pilot pressure;
a packing mounted on the movable body and configured to be displaced between a valve closed position and a valve open position integrally with the movable body, the packing including an inclined lip which is elastically deformable radially, the lip being configured to make sliding contact with an inner circumferential surface of the flow passage body;
a detector configured to detect whether or not the movable body is placed at a position that causes the packing to be positioned at the valve closed position; and
a packing support member configured to be fixed to the movable body so as to be displaced integrally with the movable body in the axial direction, to surround the packing, and to prevent the lip from being deformed radially outwardly by a predetermined amount or more,
wherein, in the valve closed position, the packing allows a working fluid to flow from the first port toward the second port, and blocks flow of the working fluid from the second port toward the first port, and in the valve open position, the packing allows the first port and the second port to communicate with each other,
and wherein, when the packing is at the valve closed position, the lip is able to be pressed and elastically deformed in a radially inward direction by the working fluid supplied from the second port, and separated away from the inner circumferential surface of the flow passage body, whereby the lip allows the working fluid to flow from the first port toward the second port.

2. The pilot check valve according to claim 1, wherein, when the lip of the packing is moved from the valve open position toward the valve closed position, the lip starts to make contact with the inner circumferential surface of the flow passage body at a sealing start position located between the valve closed position and the valve open position.

3. The pilot check valve according to claim 2, wherein when the packing is moved from the valve open position toward the valve closed position, the detector outputs a signal after the packing has been moved beyond the sealing start position.

4. The pilot check valve according to claim 1, wherein the inner circumferential surface of the flow passage body includes a sealing region configured to make pressing contact with the lip when the packing is placed at the valve closed position, and a non-sealing region configured to be separated away from the lip when the packing is placed at the valve open position; and
an inner diameter of the non-sealing region is larger than that of the sealing region.

5. The pilot check valve according to claim 1, wherein the packing support member includes:
a base having a hole and being fixed to the movable body, and
a plurality of support pieces protruding from an outer circumference of the base in a thickness direction of the base,
the plurality of support pieces being arranged at intervals in a circumferential direction of the base,
wherein a passage configured to allow the working fluid to flow from the first port toward the lip is provided between every two adjacent support pieces of the plurality of support pieces.

* * * * *